United States Patent [19]

Suginoya et al.

[11] Patent Number: 4,781,444

[45] Date of Patent: Nov. 1, 1988

[54] COLOR MEMBER HAVING ELECTRODEPOSITED COLOR LAYER COMPOSED OF POLYMER AND COLORING MATTER BONDED TO POLYMER AND METHOD FOR MANUFACTURING SAME

[75] Inventors: Mitsuru Suginoya; Koji Iwasa; Hitoshi Kamamori; Yutaka Sano; Yumiko Terada; Naoki Kato, all of Tokyo; Tameyuki Suzuki; Junichi Yasukawa, both of Kanagawa; Toyokazu Nomura, Chiba; Kazuo Tohda, Tokyo; Shinji Itoh, Chiba, all of Japan

[73] Assignees: Seiko Instruments & Electronics Ltd., Tokyo; Shinto Paint Co., Ltd., Amagasaki, both of Japan

[21] Appl. No.: 706,480

[22] Filed: Feb. 28, 1985

[30] Foreign Application Priority Data

Mar. 2, 1984 [JP] Japan .................................. 59-40654
Mar. 2, 1984 [JP] Japan .................................. 59-40655

[51] Int. Cl.$^4$ ............................ G02F 1/01; G02B 5/22
[52] U.S. Cl. .................................... 350/357; 340/785; 350/317; 350/320
[58] Field of Search ................ 340/785; 350/357, 363, 350/320, 317

[56] References Cited

U.S. PATENT DOCUMENTS

| 3,681,223 | 8/1972 | Gupton | 204/181 |
| 4,115,227 | 9/1978 | Hazan | 204/181 |
| 4,130,472 | 12/1978 | Kaplan et al. | 204/181 N |
| 4,222,828 | 9/1980 | Zuurdeeg | 204/16 |
| 4,278,579 | 7/1981 | Murphy | 260/29.3 |
| 4,304,465 | 12/1981 | Diaz | 350/357 |

Primary Examiner—Bruce Y. Arnold
Attorney, Agent, or Firm—Bruce L. Adams; Van C. Wilks

[57] ABSTRACT

A color member, for example, a multicolor filter for a display device, and a method for manufacturing the same. An electroconductive layer having a desired pattern is formed on a substrate. A colored layer containing a polymer and a coloring matter is formed on the electroconductive layer by electrodeposition. The polymer and the coloring matter contained in the colored layer are chemically bonded to each other.

24 Claims, 2 Drawing Sheets

COLOR MEMBER HAVING ELECTRODEPOSITED COLOR LAYER COMPOSED OF POLMER AND COLORING MATTER BONDED TO POLYMER AND METHOD FOR MANUFACTURING SAME

BACKGROUND OF THE INVENTION

This invention relates to colored article such as a color member, a color filter for a multicolor display and, a multicolor pattern on a substrate or the like, and to a method for manufacturing the colored article, and more specifically to a method for manufacturing a multicolor display device having color filters made of polymer layers formed by electrodeposition.

Generally, methods known in the art for forming multicolor patterns on, for example glass substrates, including coloring a glass substrate by surface-diffusion of metallic ions, coloring a glass substrate by printing and baking low-melting fritted glass, and coloring a glass substrate by forming printed pattern by screen printing with an ink containing an organic high-polymeric binder.

These methods have both merits and demerits. For example, the coloring by diffusion of metallic ions allows the glass surface to retain flatness but involves a complex process and fails to color the object in a desired hue.

The method dependent on printing has drawbacks that printing on glass is difficult, and the resultant colored layers themselves lack uniformity and transparency.

Other disadvantages common to these methods are growing difficulties to be encountered in producing finer patterns with a large number of colors and the tendency of misalignment of designs or deviation from the desired pattern position.

When substrates other than glass are used, printing and other techniques are also available for obtaining multicolor patterns. Here again finer and more-colored patterns than usual are extremely difficult to make.

Among the means to obtain fine patterns is one making use of photolithography. In that case, too, each color changeover requires a photolithographic step to be taken until a multicolor pattern is obtained, thus making the process quite complex.

FIG. 1 shows an example of a multicolor display device using color filters, wherein numeral 1 denotes a transparent substrate, 2a, 2b and 2c denote display electrodes composed of a transparent electroconductive film patterned in a desired figure or letter, 3a, 3b and 3c denote color filters formed in close contact on the surface of the display electrode 2a, 2b and 2c, respectively, 4 denotes a transparent counter electrode, and 5 denotes a transparent counter substrate. A material serving as an optical shutter made of liquid crystal or electrochromic material and opened or closed by an applied voltage is filled in the space between the two substrates 1 and 5. Color filters 3a, 3b and 3c are in different color tones. When a voltage is selectively applied between the display electrodes 2a, 2b and 2c and the counter electrode 4, a multicolor display is made.

A multicolor display using color filters is highly effective for practical use because the method is simple, free color tones can be easily obtained, and color filters can be combined with various display materials and systems.

However, when a multicolor display device using color filters are to be manufactured, care must be taken to align the patterns of the display electrodes and the color filters formed thereon with each other. Especially when a color graphic display of fine patterns in three primary colors is intended, alignment between the patterns of the display electrodes and the color filters is an important production problem involving difficulties. Color changeover for the multicolor feature is another factor that makes the process complex. Further, when the coloring is performed with dyes, an intermediate step of resist-coating treatment becomes necessary to avoid redyeing of previously colored area, thus adding to the complexity of the process. The choice of the resist-coating technique itself is a knotty problem as it varies with the type of dye to be employed.

Generally, the methods for producing color filters so far contrived have utilized screen printing, photolithographic, and other similar means. Screen printing requires no resist-coating but is not suitable for fine patterning; the more the number of colors, the lower the accuracy of the printing position, with the printed pattern increasingly being misaligned with the display pattern. Photolithography permits fine pattern but necessitates a photolithographic step for each color changeover and also a resist-coating treatment to prevent double dyeing. Consequently, the extreme complicacy offsets the advantages of the process as a simple multicoloring means.

In view of this, the present inventor proposed in Japanese patent application Nos. 233933/1982 and 233934/1982 the manufacture of color filters and of a multicolor pattern by a method of forming colored layers from solutions of a polymer and a coloring matter by electrodeposition using electrically conductive thin films on a substrate as electrodes. It was intended to provide a method for manufacturing a multicolor display device in a simplified way so that there is no misalignment of pattern with whatever fine display pattern, color changeover is possible without the need of any special resist-coating treatment, and strong, durable color filters are obtained.

However, a certain physical retention of the coloring matters in the colored layers can be obtained, where the layers are in contact with a liquid crystal or other chemical substance so that the transfer of the coloring matter to the liquid crystal from the layers, or loss of color occurs, thus marring the reliability of the display device.

SUMMARY OF THE INVENTION

An object of the invention is to provide an improved colored article and an improved method for manufacturing the same.

Another object of the invention is to provide a color member produced by using electrodeposition and having durable color.

A further object of the invention is to provide a color filter to improve the display quality of a display device.

Still a further object of the invention is to provide a method for manufacturing a color member by simple process steps.

DETAILED DESCRIPTION OF THE INVENTION

Figure 1:
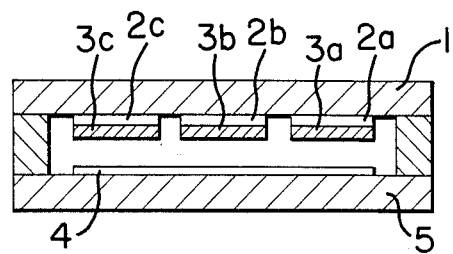
FIG. 1 is a schematic sectional view of a prior art color display device with a color member.

Colored articles, methods of forming colored layers by electrodeposition and methods for chemically bonding a coloring matter with a polymer will now be explained. A common method for electrodepositing a polymer on an electrode includes insolubilizing the polymer from a polymer solution and depositing the same on the electrode. For example, an electrodeposition coating method known in industrial fields comprises dispersing a pigment in an aqueous polymer solution, immersing a metal into the solution as an electrode, and thereby electrodepositing a colored layer on the metal. The method, known as electrodeposition coating, is used for precoating automobile bodies and the like. The principle of the method is as follows: a hydrophilic group such as carboxyl group is introduced into a polymer; the carboxyl group is neutralized and solubilized with inorganic alkali, organic amine or the like; when an electrode is immersed in the solubilized polymer solution and a voltage is applied thereto, carboxyl anions dissociated in the solution are electrophoresed toward the positive electrode and react with protons produced by the electrolysis of water on the electrode; and the polymer is insolubilized and deposited. Thus, the reaction of the following formula takes place on the positive electrode and a polymer is deposited. This is known as anionic electrodeposition.

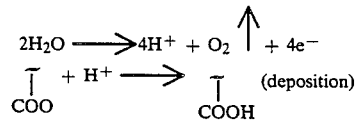

Reversely, when a basic group (e.g., polyamine) is used as the hydrophilic group to be neutralized and solubilized by acid, a polymer is deposited on the negative electrode. This is known as cationic electrodeposition.

In case the electrodeposited polymer has an electrically insulating characteristics, the electrodes are coated with the polymer and the current is reduced, whereby an increase in the film thickness would not be expected and the electrodes would be prevented from being coated with the polymer any more. Actually, however, the complete coating can be prevented by oxygen bubbles evolved by the electrolysis of water, and some film thickness is obtained. The polymer film acquired has a low water content by dint of electroendosmosis and has a uniform thickness.

As a polymer for such anionic electrodeposition, an addition compound of natural drying oil with maleic acid, an alkyd resin having carboxyl groups, an addition compound of epoxy resin with maleic acid, a polybutadiene resin having carboxyl groups, a copolymer of acrylic or methacrylic acid with its ester, or the like are used. Other polymer or organic compounds having other functional groups may be sometimes incorporated into a polymer structure according to the feature of the electrodeposition coating. These polymers are selectively used according to the desired characteristics of the colored layer. For example, if a transparent colored layer is required, an acrylic polymer or oil-free polyester polymer is preferably selected. Methods for manufacturing electrodeposition polymers vary according to the kinds of polymers. For example, the manufacture of acrylic polymers includes radical copolymerization of acrylic or methacrylic acid having the acidic group with acrylic or methacrylic ester having the neutral group. In this case, the ratio of the carboxyl to the neutral groups is important; if the carboxyl group is too much, the insolubilization of the electrodeposited polymer is insufficient, while if it is too little, the solubility upon neutralization becomes insufficient. An OH group is sometimes incorporated in order to increase the solubility. After the decision on the monomer composition, the polymerization is usually carried out using an ordinary radical polymerization initiator in a hydrophilic solvent such as isopropyl alcohol, n-butyl alcohol, tert-butyl alcohol, methyl cellosolve, ethyl cellosolve, isopropyl cellosolve, butyl cellosolve and diethylene glycol methyl ether.

Therefore, the present invention disclosed in Japanese patent application Nos. 99017/1983 and 64117/1983 that electrodeposited colored films with good transparency can be obtained by using dyes insoluble or slightly soluble in water as coloring matter and the resultant colored films can be used for a color member or a multicolor display device. It is to be noted, however, that some of water-insoluble dyes are highly soluble in various organic solvents. In case of a multicolored liquid crystal display with such kinds of dye, it is possible that dissolution of the coloring matters into the liquid crystal takes place because the colored layers are in contact with the liquid crystal within a cell. This possibility renders it necessary to evaluate beforehand the reliabilities of the particular dyes to be employed. In other applications, the color durability is generally required.

The present invention is predicted upon the discovery of a method for chemically bonding a polymer with a coloring matter to form durable colored layers so as to enhance the chemical stability or colorfastness of the multicolor pattern formed by electrodeposition.

At the present time, reactive dyes are commercially available as dyes chemically combinable with polymeric fibers, and the colorfast properties of the dyed goods are highly evaluated. Most reactive dyes on the market have an ionizable group, such as sodium sulfonate, which imparts water solubility. When such a dye is added to an electrodeposition bath and electrodeposition is carried out in the usual manner, its rate of electrophoresis widely different from that of the polymer takes the film thickness and its uniformity extremely difficult to control. This means that the coloring matter to be used for electrodeposition is desired to be slightly charged electrically to perform electrophoresis generally at the same rate as the polymer. A first method to attain this end comprises chemically bonding the reactive dye by a reaction with the polymer to produce a colored polymer for electrodeposition. It has now been found that the above-mentioned problem arising from the difference in the rate of electrophoresis between the dye and the polymer is solved in this way.

Generally, reactive dyes have an active group such as monochlorotriazinyl, dichlorotriazinyl, vinylsulfonyl, chloropyrimidinyl, chloropyridazonyl, alkylsulfate, chloroquinoxalinyl, or acrylamide group. Dyeing is effected as such a group of the dye reacts chemically with the OH group of cellulosic fiber or with the amino group of nylon, wool, silk or the like. For example, reactions with the OH group under alkaline conditions takes place in the following way:

(1) in the case of a monochlorotriazinyl group

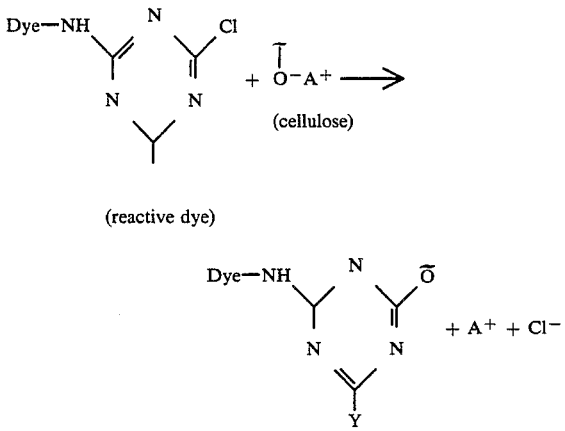

wherein $A^+$ is $Na^+$ or $K^+$, (2) in the case of a vinylsulfonyl group

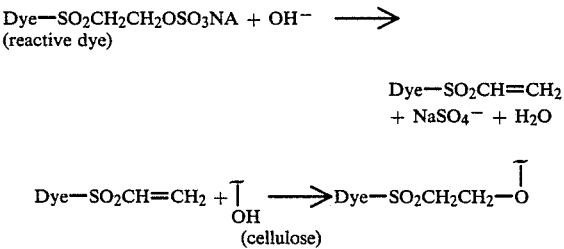

(3) in the case of an alkylsulfate group

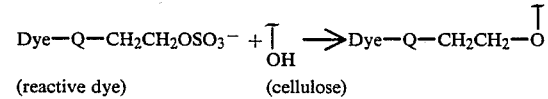

where Q is $—SO_2NH—$ or -alkylene-N(alkyl).

As stated, the reactive dye is bonded with the polymer by a covalent linkage, thus imparting great fastness to the product. When the colored polymer thus obtained is utilized as a polymer for electrodeposition, the coloring matter or material and the polymer remain combined throughout the electrodeposition and they can form an integral colored layer. Since the polymer usually contains, for the purpose of increased water solubility, a fairly high percentage of OH group that can react on the reactive group of the reactive dye, the OH group permits the practice of the present invention without difficulty.

Another method of utilizing a reactive dye comprises removing the ionizable group from the dye and weakening its electric charge to a level corresponding to the rate of electrophoresis of the particular polymer. One way of accomplishing this is to replace the sodium sulfonate group in the dye molecule with a weakly dissociating functional group such as OH or amino group. As the simplest way, sodium of sodium sulfonate in the dye molecule may be ion-exchanged with calcium or barium to make the dye scarcely soluble in water. This is done by adding calcium or barium salt to an aqueous solution of the dye and obtaining the precipitate. When the scarcely water-soluble reactive dye thus obtained is dispersed together with the polymer in water and electrodeposition is performed, a colored electrodeposited film results. The bonding of the polymer with the reactive dye is concluded by subsequent heat treatment and a colorfast layer can be obtained.

The present invention will now be described in detail in connection with examples thereof.

EXAMPLE 1

A polyester resin for anionic electrodeposition, comprising trimellitic anhydride and trimethylolpropane as chief ingredient monomers and having an acid value of 50 and a hydroxyl value of 70 was employed as a polymer. This resin appeared to have partially the following structure:

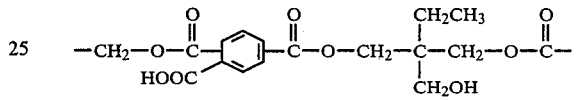

This resin had a carboxyl group that was essential for electrodeposition and an OH group that enhanced water solubility. The resin was made water-soluble upon neutralization of the carboxyl group with an alkali or amine, and was itself anion-electrodepositable. For its reaction with a reactive dye, an aqueous solution of the resin made alkaline in the manner described was heated to 80° C. after the addition of a red reactive dye (trademark: "Cibacron", a product of Ciba Geigy) having a monotriazinyl group. Care was taken not to use too high a temperature because overheating would cause hydrolysis of the polyester resin. After the reaction for 1 to 2 hr, the reaction product was cooled and made acidic by the addition of sulfuric acid or the like, when a dyed resin precipitated. This resinous precipitate was repeatedly washed with acid and alkali to remove unreacted dye and impurity ions therefrom. The thoroughly washed resin was dissolved in ethyl cellosolve to prepare a solution at a resin concentration of 70%, and the pH of the solution was adjusted with an amine to 7.5–8.0. This solution was mixed with a water-soluble melamine resin at a polyester to melamine ratio of 7:3 to impart a thermosetting property to the product, and the mixture was diluted with water to a total resin concentration of 10%. A red electrodeposition bath was thus prepared.

Then, the reactive dyes in blue and green colors were used and blue and green electrodeposition baths were prepared in the same manner.

Figure 2:
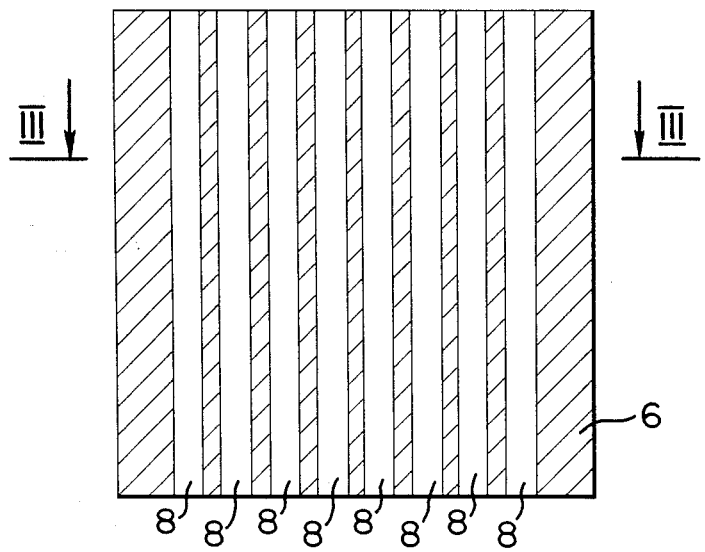
FIG. 2 is a schematic plan view showing an embodiment of the present invention.
Figure 3:
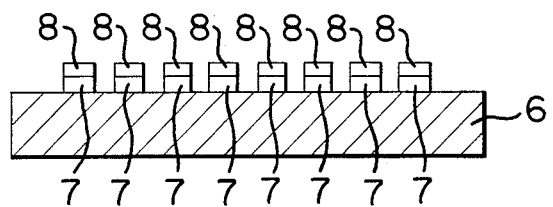
FIG. 3 is a cross-sectional view taken along line III—III of FIG. 2.

Using these electrodeposition baths, a colored article in the form of a multicolor display device as shown in FIG. 2 and FIG. 3 was made. The method will now be explained in detail.

(1) Patterning Process

Numeral 6 denotes a substrate made of a transparent material, on which a transparent electroconductive tin oxide film is formed by the spray coating method. The transparent electroconductive film is patterned in stripes by etching to obtain transparent electrodes 7.

(2) Electrodeposition Process

The substrate 6 on which the transparent electrodes 7 are formed is immersed in an electrodeposition bath prepared as described above. Transparent electrodes to be colored identically are selected from the electrodes 7 patterned in the shape of stripes. A voltage of 10 V is applied for 3 minutes using the selected electrodes as the positive electrodes. A large current flows immediately after the voltage application, and the current gradually declines to almost zero. After the voltage application the substrate 6 is taken out and throughly washed with water to remove the solution deposited on the portions to which the voltage has not been applied. When the substrate is dried after washing, a colored layer with excellent transparency is formed on the electrodes to which the voltage has been applied.

(3) Curing Process

The polyester resin and melamine resin in the colored layer formed by electrodeposition are cured by condensation reaction induced by baking. When the resins are baked in air at 175° C. for 30 minutes, the colored layer is completely cured. The film thickness of the colored layer on this occasion is 1.5 $\mu$m.

The cured colored layer is a complete insulation layer which is never electrodeposited nor dyed when again immersed and subjected to a voltage in the electrodeposition bath. Therefore, the second and third colored layers are formed by repeating the sequence of: selecting another set of display electrodes to be colored identically again; electrodepositing the display electrodes in the electrodeposition bath in which a dye of different color tone is dispersed; and curing.

In this embodiment, striped color filters 8 of 200 $\mu$m width in the order of red, blue, and green were manufactured by the following extremely simple method: patterning process→electrodeposition process for red filter→curing process→electrodeposition process for blue filter→curing process→electrodeposition process for green filter→curing process. The acquired color filters had no color shift and were uniform and highly resistant to acids, alkalies, various kinds of organic solvents, and hot water.

EXAMPLE 2

Figure 4:
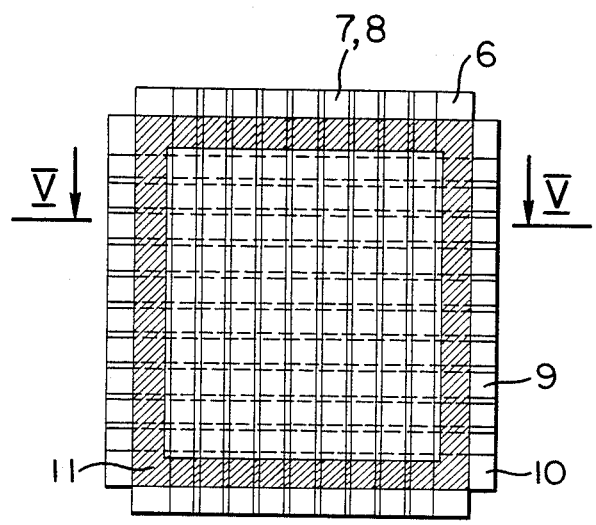
FIG. 4 is a schematic plan view showing an embodiment of the multicolor display device using the color member of the present invention.
Figure 5:
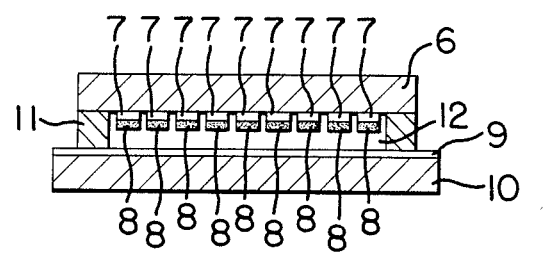
FIG. 5 is a cross-sectional view taken along line V—V of FIG. 4.

An embodiment of the multicolor display device having a color member of the Example 1 is shown in FIG. 4 and FIG. 5.

Using the method of Example 1, the color filters 8 were formed on the transparent electrodes 7. The substrate 6 was disposed oppositely to a counter substrate 10 interposing spacers 11 therebetween. The electrodes 7 faced counter electrodes 9 and the directions of the strips of the two intersected at right angles in an integral unit as a cell. A multicolor liquid crystal display device was made by filling the cell with a TN-FEM liquid crystal as a display material 12. A voltage was appllied between the transparent electrodes 7 and the counter electrodes 9, and the cell was sandwiched between a polarizer and an analyzer whose transmission axes were parallel, whereby colors of the transparent color filter 8 were displayed when viewed from the substrate 6 or the counter substrate 10. The cell was black when the voltage application was cut off. When a light came from the direction of the counter substrate 10, colors of the color filters 8 were more vividly displayed owing to the excellent transparency of the cell. As illustrated, it is clear that the method for manufacturing a multicolor display device embodied here realizes color filters of fine patterns without impairing the display quality notwithstanding its simplicity, whereby a color graphic display device of matrix drive with high reliability is provided. Moreover, this display device, when allowed to stand at 60° C. for 1000 hr, exhibits high reliability, practically retaining the original color and electro-optical properties.

EXAMPLE 3

A multicolor liquid crystal display device similar to the device of Example 2 was made of a negative-type guest-host liquid crystal using block dichroic coloring matter as the display material 12 and a white material (white ceramic) as the substrate 6. A voltage was applied between the transparent electrodes 7 and the counter electrodes 9. Viewing from the direction of the transparent counter substrate 10 through the polarizing plate, the colors of the color filters 8 were clearly displayed. When the voltage application was discontinued, the color of the dischroic coloring matter, i.e., black, was displayed. This example showed effects similar to those of Example 1.

EXAMPLE 4

A DSM liquid crystal was used as the display material 12 and aluminum was patterned in the counter substrate 6 by the mask evaporation method to serve as the display electrodes 7 in this example. Excepting these, the procedure of Example 1 was followed to make a multicolor liquid crystal display device. A voltage was applied between the transparent electrodes 7 and the counter electrodes 9. Viewing from the direction of the transparent counter substrate 10, the DSM liquid crystal was in a light scattering state, and the colors of the color filters 8 were displayed in a milk white background. When no voltage was applied, the light scattering state disappeared and the display was darkened. To produce the light scattering state of the DSM liquid crystal efficiently, an ionic current of a certain intensity had to be used, but this could be interrupted by the high resistance of the color filters 8. Therefore, transparent electrodes whose patterns corresponded to those of the transparent electrodes 7 were provided on the color filters 8. The transparent electrodes served as electrodes for applying a voltage, whereby the drive voltage was reduced and effects similar to those of Example 1 were acquired.

EXAMPLE 5

The reactive dyes used in Example 1 were replaced by reactive dyes having a phosphonate group (trademark: "Procion T", manufactured by Imperial Chemical Industries Ltd.). This type was reactive under neutral or acidic conditions, and therefore the polyester resin of Example 1 was added to a neutralized aqueous solution of the dye, and the reaction was effected with the application of heat. Since the reaction took place in a neutral environment, the polyester scarcely decomposed and higher temperatures could be used than usual for the reaction.

Following the reaction, the procedure of Example 1 and Example 2 were repeated to manufacture a multicolor member and a multicolor display device. It achieved effects similar to those of Example 1 and Example 2.

EXAMPLE 6

A multicolor member and a multicolor display device were made in the same way as described in Example 1 and Example 2 except that the reactive dyes were replaced by those having a vinylsulfonyl group ("Sumifix", manufactured by Sumitomo Chemical Co.) and similar effects were obtained.

EXAMPLE 7

A multicolor member and multicolor display device were made in the same way as in Example 1 and Example 2 except that the reactive dyes used were those having a chloropyrimidinyl group ("Drimarene", manufactured by Sandoz Ltd.). It gave effects similar to those according to Example 1 and Example 2.

EXAMPLE 8

In place of the reactive dyes in Example 1, reactive dyes having a chloropyridazonyl group ("Primazine P", manufactured by BASF AG) were used, and otherwise in the same manner as in Example 1 and Example 2 a multicolor member and multicolor display device were made. It showed effects similar to those in Example 1 and Example 2.

EXAMPLE 9

The reactive dyes in Example 1 were replaced by those having an alkylsulfate group including, e.g., that having a color index number "C.I. Reactive Blue 19" and otherwise the same procedures as in Example 1 and Example 2 were followed to manufacture a multicolor member and a multicolor display device. The product was generally as effective as in Example 1 and Example 2.

EXAMPLE 10

Using reactive dyes having a chloroquinoxalinyl group ("Levafix E", manufactured by Bayer AG) instead of the reactive dyes of Example 1, a multicolor member and a multicolor display device were made in the same way as in Example 1 and Example 2 to obtain similar effects.

EXAMPLE 11

In place of the polymer used in Example 1, an acrylic resin for anionic electrodeposition comprising acrylic acid and hydroxyethyl methacrylate as chief monomeric components and having an acid value of 50 and hydroxyl value of 40 was employed. This resin was presumed to have partially the following structure:

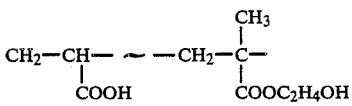

It again contained carboxyl and OH groups and, like the polyester, it could be chemically bonded with a reactive dye prior to electrodeposition.

Excepting this, the procedures of Example 1 and Example 2 were repeated to manufacture a multicolor member and a multicolor display device and effects similar to those in the first and second examples were attained.

EXAMPLE 12

When a reactive dye having a dichlorotriazinyl group ("Mikacion", manufactured by Mitsubishi Chemical Industries, Ltd.) was dissolved in water and calcium chloride was added, the dye was made insoluble in water and formed a color precipitate. This insolubized coloring matter was filtered, separated, thoroughly washed with water, and dried. The resulting coloring matter was mixed with and thorously dispersed in a mixed polyester-melamine coating material for anionic electrodeposition ("S-Via ED-3000", manufactured by Shinto Paint Co.) at a coloring matter to resin mixing ratio of 2:8. This mixture was diluted with water to obtain an aqueous solution at a resin concentration of 10%, and the resulting solution was used as an electrodeposition bath.

Using this electrodeposition bath and otherwise in the same manner as described in Example 1 and Example 2, a multicolor member and a multicolor display device were made and similar effects were obtained.

In this example the bonding between the coloring matter and the polymer presumably took place when the polyester and melamine were cured together. It is likely that the colorant reacts with the methylol group of the melamine resin as well as with the carboxyl and OH groups of the polyester.

EXAMPLE 13

When a reactive dye having an acrylamide group ("Lanasol", manufactured by Ciba Geigy) was dissolved in water and then calcium chloride was added, the dye became insoluble in water and formed a color precipitate. The insolublized coloring matter was filtered, separated, thoroughly washed with water, and dried. This coloring matter was mixed with and thoroughly dispersed in an acrylic coating material for cationic electrodeposition ("S-Via ED-5000", manufactured by Shinto Paint Co.) at a coloring matter to resin mixing ratio of 2:8. The resulting mixture was diluted with water to prepare an aqueous solution at a resin concentration of 10% as an electrodeposition bath.

Then, the polarity of the applied voltage for electrodeposition in Example 1 was reversed and otherwise in the same way as in Example 1 and Example 2, using this electrodeposition bath, a multicolor member and a multicolor display device were manufactured and effects similar to those in the first and second examples were obtained. The reaction that took place in each colored layer in this embodiment was considered as a reaction of the coloring matter with the acrylamide.

As stated precisely in the foregoing embodiments, the present invention makes it possible to obtain a multicolor member having a fine multicolor pattern in a simple way by taking advantage of electrodeposition and to manufacture color filters without resorting to any special means such as resist-coating treatment for separating the individual colors for multicolor representation. The color filters thus made are strong and durable because the coloring matter and the polymer are chemically bonded and the patterns are in good alignment. When combined with display materials such as liquid crystals, they can realize high display quality and reliability.

What is claimed is:

1. A colored article comprising: a substrate; an electroconductive layer disposed on the substrate and configured in a desired pattern; and a colored layer electrodeposited on the electroconductive layer, the colored layer being comprised of a polymer and a coloring material chemically bonded to the polymer.

2. A colored article according to claim 1; wherein the electroconductive layer comprises a light transmission electroconductive layer.

3. A colored article according to claim 2; wherein the transparent electroconductive layer is composed of a material selected from the group consisting of tin oxide, indium oxide and antimony oxide.

4. A colored article according to claim 1; wherein the coloring material comprises a dye having a reactive group which reacts with the polymer to chemically bond the dye to the polymer, the reactive group being selected from the group consisting of phosphonate, monochlorotriazinyl, dichlorotriazinyl, vinylsulfonyl, chloropyrimidinyl, chloropyridazonyl, alkylsulfate, chloroquinoxalinyl and acrylamide.

5. A colored article according to claim 1; wherein the polymer comprises water-soluble or dispersible resin selected from the group consisting of acrylic resin, polyester resin and melamine resin.

6. A multicolored article comprising: a substrate; a plurality of electroconductive layers disposed on the substrate and configured in desired patterns; and differently colored layers having different color tones and being electrodeposited on respective ones of the electroconductive layers, each differently colored layer being comprised of a polymer and a coloring material chemically bonded to the polymer to impart a different color tone to the polymer.

7. A colored article according to claim 6; wherein the differently colored layers comprise a red-colored layer, a blue-colored layer and a green-colored layer.

8. A color filter for filtering incident light comprising: a transparent substrate; a transparent electroconductive layer disposed on the substrate and configured in a desired pattern; and a colored layer electrodeposited on the electroconductive layer, the colored layer being comprised of a transparent polymer and a coloring material chemically bonded to the polymer.

9. A display device including a color filter according to claim 8.

10. A colored article comprising: a substrate; an electroconductive layer disposed on the substrate and configured in a desired pattern; and a colored layer electrodeposited on the electroconductive layer, the colored layer being comprised of a polymer and an organic coloring material chemically bonded to the polymer.

11. A method of manufacturing a colored article comprising the steps of: forming an electroconductive layer on a substrate; co-electrodepositing a polymer and a coloring material on the electroconductive layer to form a colored layer thereon; and chemically bonding the coloring material to the polymer.

12. A method according to claim 11; wherein the electroconductive layer comprises a light transmissive electroconductive layer.

13. A method according to claim 11; wherein the electroconductive layer is composed of a material selected from the group consisting of tin oxide, indium oxide and antimony oxide.

14. A method according to claim 11; wherein the coloring material is chemically bonded to the polymer through a reactive group selected from the group consisting of phosphonate, monochlorotriazinyl, dichlorotriazinyl, vinylsulfonyl, chloropyrimidinyl, chloropyridazonyl, alkylsulfate, chloroquinoxalinyl and acrylamide.

15. A method according to claim 11; wherein the polymer is comprised of water-soluble or dispersible resin selected from the group consisting of acrylin resin, polyester resin and melamine resin.

16. A method according to claim 11; wherein the coloring material is chemically bonded to the polymer after the step of electrodepositing.

17. A colored article manufactured by the method according to claim 11.

18. A method of manufacturing a multicolored article comprising the steps of: forming a plurality of electroconductive layers on a substrate; selectively electrodepositing differently colored layers having different color tones on respective ones of the electroconductive layers, each differently colored layer being comprised of a polymer and a coloring material; and chemically bonding the coloring material to the polymer to impart a different color tone to each differently colored layer.

19. A method according to claim 18; wherein the differently colored layers are comprised of a red-colored layer, a blue-colored layer and a green-colored layer.

20. A multicolored article manufactured by a method according to claim 18.

21. A method of manufacturing a color filter comprising the steps of: forming a transparent electroconductive layer on a transparent substrate; co-electrodepositing a transparent polymer and a coloring material on the electroconductive layer to form a colored layer thereon; and chemically bonding the coloring material to the polymer.

22. A color filter manufactured by the method according to claim 21.

23. A display device including a color filter according to claim 22.

24. A method of manufacturing a colored article comprising the steps of: preparing an electrodeposition bath containing a polymer and a coloring material chemically bonded to the polymer; forming an electroconductive layer on a substrate; and electrodepositing the polymer on the electroconductive layer within the electrodeposition bath to form a colored layer.

* * * * *